H. A. STEARNS.
MANUFACTURING COTTON WADDING.
No. 5,773.　　　　　　　　Patented Sept. 19, 1848.
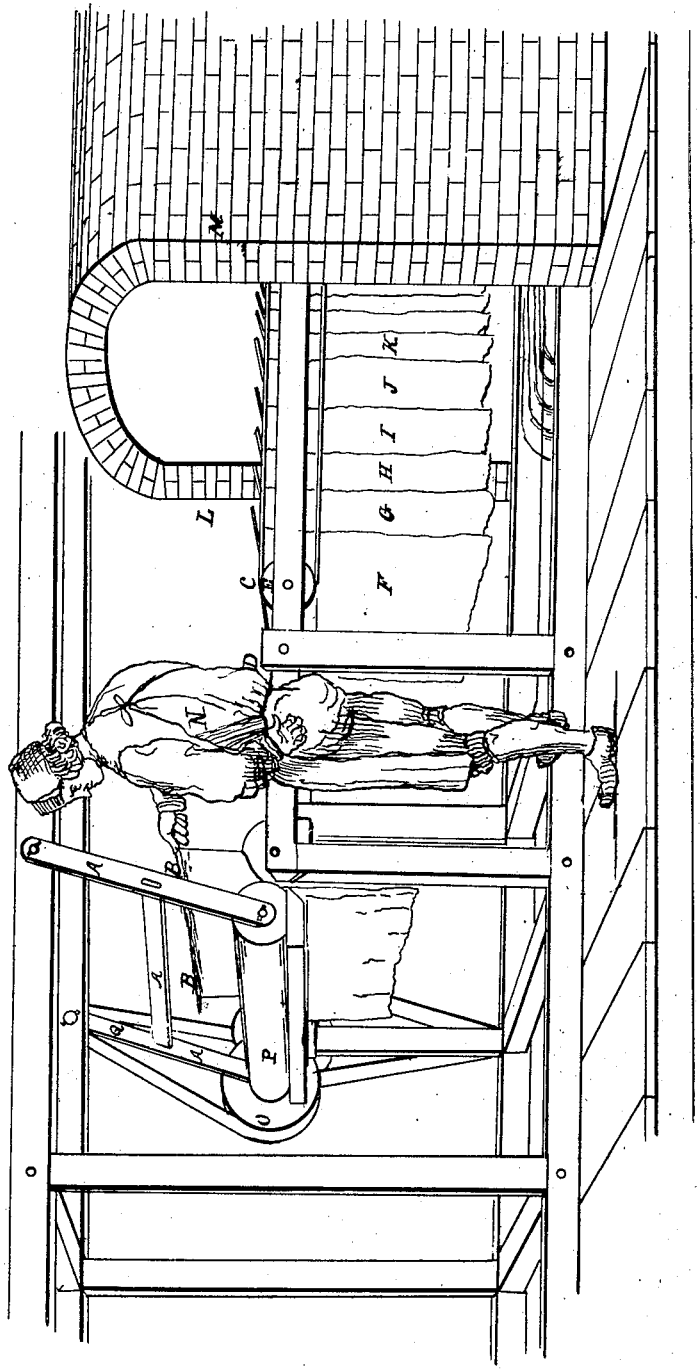

UNITED STATES PATENT OFFICE.

HENRY A. STEARNS, OF CINCINNATI, OHIO.

SIZING AND DRYING COTTON-BATTING.

Specification of Letters Patent No. 5,773, dated September 19, 1848.

*To all whom it may concern:*

Be it known that I, HENRY A. STEARNS, of the city of Cincinnati, county of Hamilton and State of Ohio, have invented a new and Improved Mode of Manufacturing Cotton Wadding; and I do hereby declare the following to be a full and exact description of the same.

The nature of my invention consists in providing two parallel metallic rollers for sizing, one of which is hung on a frame which is movable, so as to allow a small stick, with the cotton batting attached, to be passed between the rollers, to be sized on both sides. Also a long, narrow drying chamber, heated by steam pipes (or in any other way,) through the whole length of which the cotton batting when sized is made to pass slowly, by resting the two ends of the said sticks upon, or across, two endless belts, which pass through its whole length, all of which is done by one operator, thus sizing the wadding with greater perfectness in the first place, and drying it more equally and rapidly, and with less labor, than by any mode heretofore adopted.

To enable others skilled in the art, to make and use my invention, I will proceed to describe its construction and operation.

I construct two metallic rollers, three to four feet long, and four to six inches diameter, one of which is made to revolve upon fixed points, and the other upon points in a movable frame A (see drawing) so as to rest by gravity against the side of the first or it may be made to press lightly against the other by a spring or weight. Each roller revolves in a trough containing the sizing matter, and takes it up as it revolves. The rollers revolve very slowly. The hanging roller is made to press so lightly against the fixed roller, that the operator can pass the stick B from below, upward between the two rollers carrying the piece of cotton batting after it. The movable roller with its frame A gives way easily to the stick, and closes again upon the cotton batting till it is carried through. As soon as the batting is thus drawn through the two rollers, being covered on both sides with the wet sizing, it is laid across the two endless belts C and D, by resting the ends of the stick B crosswise upon the belts, and these endless belts are drawn with a slow motion around the wheels E, by means of which the pieces of sized batting F, G, H, I, J, K, &c., are made to pass slowly through the whole length of the drying chamber L, M, and are speedily and thoroughly dried by the time they arrive at the other end. The mouth of this drying chamber is situated near the right hand of the operator, and the wheels E are made to revolve about on a level with the sizing rollers and a short distance from the right hand of the operator, in advance of the mouth of the drying chamber, or within the mouth, at pleasure. It is best to place the sized batting within the mouth of the drying chamber at once, so that the heat may strike the batting as soon as it is sized and suspended across the endless belts; as the application of the heat immediately after the sizing is applied, sets the sizing, and causes it to dry equally on the sheet, which improves the wadding for all useful purposes. In the drawing hereto attached the mouth of the drying chamber is placed farther off from the operator than it should be in reality, in order to show the manner in which the drying process is contrived, and the chamber heated. The sticks may be laid across the endless belts at a distance of from two to six inches apart, according to the heat of the chamber and the work to be done. The endless belts may be made to revolve around the wheels E with more or less rapidity, according to circumstances, by simple mechanical means familiar to all.

The drying chamber is from five to six feet high in the clear, and from four to five feet wide, in the clear, it is from eighty to one hundred feet long, and is open at the end nearest the operator, and closed by a gate at the other end, and immediately inside of the gate there is a clear space for the wadding to fall into, as it reaches the end of the belts C, D, and passes over two wheels like the wheels C and D. From this space the pieces of wadding may be removed by opening the gate, whenever they accumulate to any amount. After pulling out the sticks they are ready for cutting into proper size and packing in bales for sale. The drying chamber is constructed of brick with narrow slits in the top for ventilation which slits are covered with iron shutters to regulate the ventilation. It has an iron door in one side, by which a man can enter, or look in and observe the process of drying. It is heated by me at present by the waste steam of the engine of my factory, which is conducted through steam pipes laid longitudinally side by side along the floor. Besides the economy of this plan, it heats the chamber more equally and safely than by other modes. But any mode of heating the chamber may be adopted which circumstances make more convenient.

At the left hand of the operator N, stands a common carding machine, which is not represented in the drawing, from the lap-drum of which the operator takes the cotton batting, in pieces of the proper length say three and a half feet as soon as the same has accumulated of the proper thickness. He catches one end of it upon the stick B, B, and immediately passes it longitudinally from beneath upward between the rollers, as in the drawing. No other hand is required at the operation of sizing, but a boy to remove the dried wadding when it has filled the empty space at the other end of the drying chamber.

For obvious reasons, the band which turns the drum O, attached to the movable or hanging roller P is made to pull in the direction A, Q, so as not to pull the roller out of its direction.

That part of the foregoing specification which I claim as new, and my own invention, and desire to secure by Letters Patent, is—

1. The attaching one of the rollers to a movable frame, bringing it in contact with the other roller either by its own weight or a spring, thus allowing the stick B to be passed between the two rollers, and causing the movable roller to close again immediately upon the batting which follows the stick.

2. The attaching of each piece of cotton batting to a stick, and the passing the stick, with the cotton attached, between the rollers.

3. The placing of the long narrow drying chamber with its open mouth within reach of the operator, having two endless bolts passing through its length upon which the operator can place the two ends of the stick containing the cotton wadding, and subject it to immediate heat, and cause it to be conveyed slowly through the entire length of the drying chamber, without further trouble.

4. And I claim the combination of the three foregoing items, viz., the movable roller, the passing of the stick between the two rollers, and the placing of the sized wadding immediately through the drying chamber by means of endless belts, as a new and improved mode of manufacturing cotton wadding.

I do not claim the use of two sizing rollers, or the use of a drying chamber, as both of these have been used before.

HENRY A. STEARNS.

Signed in presence of—
J. B. RUSSELL,
GEO. S. STEARNS.